W. A. RIDDELL.
PHOTOGRAPHIC CAMERA.
APPLICATION FILED APR. 18, 1917.

1,251,105.

Patented Dec. 25, 1917.

WITNESSES:
Nelson H. Capp

INVENTOR
William A. Riddell
BY
his ATTORNEYS

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

1,251,105.  Specification of Letters Patent.  Patented Dec. 25, 1917.

Application filed April 18, 1917. Serial No. 162,982.

*To all whom it may concern:*

Be it known that I, WILLIAM A. RIDDELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras of the type in which provision is made for identifying each exposure at the time it is taken by marking with a stylus from the exterior of the camera through a suitable opening therein and the invention has for its object to provide an improved closure for the opening through which the marking or writing is done. The improvements are directed toward the means for holding the stylus on the closure and toward so constructing the latter that it will be compact and sightly and be protected from wear and damage due to careless handling of the camera. To these and other ends the invention resides in certain improvements and combinations of parts all as will be hereinafter more fully described, the novel features being pointed out in the claims at the end of the specification.

Figure 1:
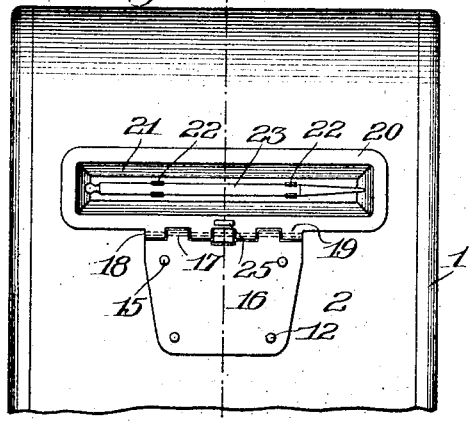
Figure 1 is a fragmentary elevation of a camera back constructed in accordance with and illustrating one embodiment of my invention.
Figure 3:
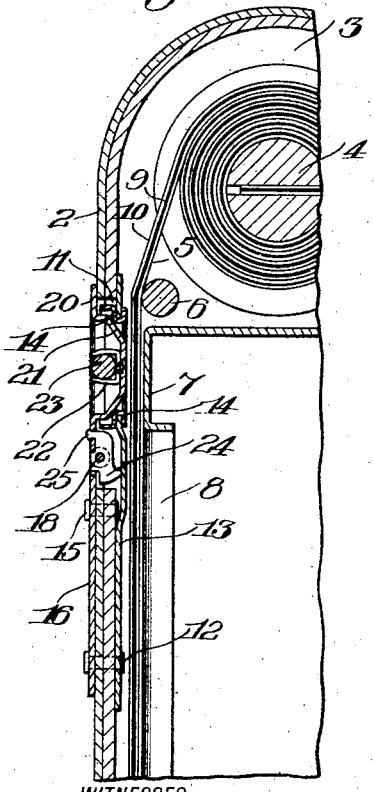
Figure 4:
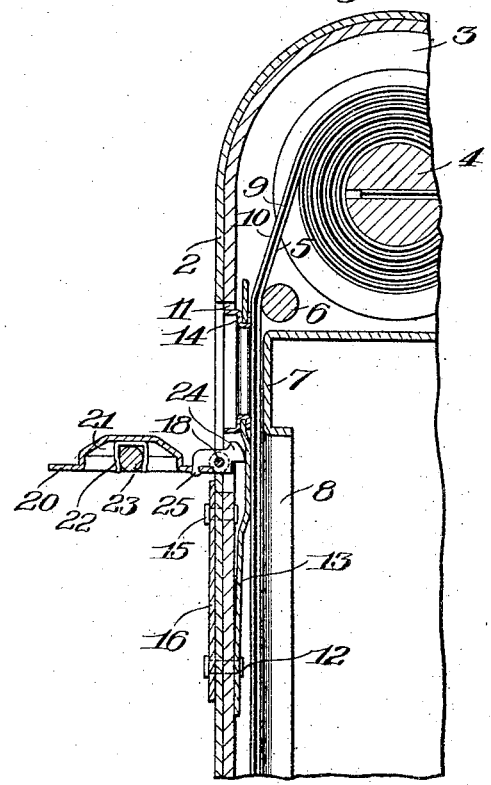

Fig. 3 is an enlarged fragmentary section taken substantially on the line 3—3 of Fig. 1 showing the closure in closed position, and Fig. 4 is a similar view showing the closure open.

Similar reference numerals throughout the several views indicate the same parts.

I have illustrated my invention in connection with a well known form of pocket or folding roll holding camera. In Fig. 1, 1 indicates the sides of the camera body and 2 the detachable back constituting its rear wall. Referring to the sectional views, 3 indicates a roll film chamber, 4 the film spool, 5 the film and 6 a guide roll over which the film passes to cross a frame 7 that contains the exposure opening 8. Superposed upon the film strip 5 is a carbon web 9 and a protective backing 10. The back 2 is provided with an elongated slot or opening 11 that registers with one side of the frame 7 and when a pencil or stylus is inserted through the opening and pressed against the film and its coverings, the latter is supported by the frame 7 acting as a table and the marks are first inscribed and then light printed on the film in a manner now too well known to require further description here.

In the practice of my invention I secure to the inner side of the back 2 as by the rivets 12, a spring plate or arm 13 which carries at its free end a flanged frame 14 that is adapted to be pressed against the frame 7 to hold the film firmly while it is being written against and prevent the light from dispersing over too great an area of the film. The tendency of the spring arm is to hold the frame 14 in a normal retracted position within the opening 11 but the frame is so formed that in this position it does not project out of the opening at the back but lies entirely inside of the plane of the outer surface of the latter.

Secured to the outside of the back 2 by the rivets 12 and additional rivets 15 is an attaching plate 16 preferably of thin sheet metal and carrying in inwardlly and forwardly turned knuckles 17 a pintle 18. Hinged to this pintle 18 by knuckles 19 similar to the knuckles 17 is a door plate or closure 20 which normally closes and fits tightly about the opening 11. This closure does not, at any point, project rearwardly of the plate 16 that lies flush therewith. In other words, both the plate 16 and closure 20 project from the rear face of the back 2 only to the extent of the thickness of the metal of which they are composed. The central portion of the closure is embossed in a forward or inward direction to provide a recess 21 which is accommodated within the center of the frame 14 when the closure is in position. Within the depression are spring clips 22 that hold the metal or other stylus 23, all of these parts being below the flat rear surface of the closure and of the plate 16.

Figure 2:
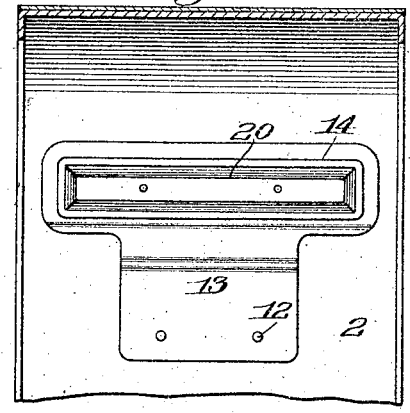
Fig. 2 is a view of the inner side of the camera back partly in section.

The door or closure swings on the pintle 8 from the closed position of Figs. 1, 2 and 3 to the open position of Fig. 4. As it does so, a cam lug 24 thereon surrounding the pintle 18 and riveted to the closure at 25 to lie on the inner or forward side thereof, engages the spring arm 13 and moves the frame 14 to operative or clamping position against the film, as shown in Fig. 4. Also, the spring 13 in turn in this position so exerts its pressure upon the cam lug 24 with reference to the hinge center 18 that it tends to maintain the cover open. Similarly, it will be seen by inspection of Fig. 3 that when the door 20 is closed, the engagement of the spring arm with the lug 24 tends to maintain it closed. The door is opened for the purpose of making the inscription and closed immediately thereafter, releasing the film 5 and accompanying strips for further winding.

It will be noted that with this structure the stylus 23 is so held that it is protected as well as its clips 22 and is not apt to become accidentally dislodged and lost or its clips damaged. The whole device presents such a flat surface on the exterior of the camera that it allows the latter to lie flat on a supporting surface and there are no projecting parts to catch in the clothing or be damaged by rough contact.

I claim as my invention:

1. The combination with a camera wall having an opening therein adapted to permit marking the sensitive material and a spring clamping member for the latter carried on the inner side of the wall and embodying a frame having an inoperative position within the opening but entirely inside of the plane of the outer surface of the wall, of a displaceable cover for the opening having a plane outer contacting surface.

2. The combination with a camera wall having an opening therein adapted to permit marking the sensitive material and a spring clamping member for the latter carried on the inner side of the wall and embodying a frame having an inoperative position within the opening but entirely inside of the plane of the outer surface of the wall, of a flat sheet metal attaching leaf on the said outer surface of the wall and a cover for the opening hinged to said leaf to lie wholly on the inner side of the plane of the outer surface thereof.

3. The combination with a camera wall having an opening therein adapted to permit marking the sensitive material and a spring clamping member for the latter carried on the inner side of the wall and embodying a frame having an inoperative position within the opening but entirely inside of the plane of the outer surface of the wall, of a displaceable cover for the opening formed to present a plane outer contacting surface and having a depression therein normally lying within the clamping frame, and a stylus holder within the depression.

4. The combination with a camera wall having an opening therein adapted to permit marking the sensitive material, a spring arm carried on the inner side of said wall, and a clamping device on the spring arm consisting of a frame having an inoperative position within the opening but entirely inside of the plane of the outer surface of the wall, of a flat sheet metal attaching leaf on the outer surface of the wall, a cover for the opening hinged thereto and a cam on the cover coöperating with the spring arm to hold the cover in open or closed position and to move the clamping member to operative position, all of said elements being arranged to lie wholly on the inner side of the plane of the outer surface of the attaching leaf.

WILLIAM A. RIDDELL.

Witnesses:
M. JOSEPH SULLIVAN,
R. HARRY RUTAN.

Copies of this patent may be obtained for five cents each, by addressing the "Commissioner of Patents, Washington, D. C."